US008143995B2

(12) United States Patent
Soppera et al.

(10) Patent No.: US 8,143,995 B2
(45) Date of Patent: Mar. 27, 2012

(54) CONTROL OF DATA EXCHANGE (75) Inventors: Andrea Soppera, Ipswich (GB); Trevor Burbridge, Ipswich (GB); Vivekanand Korgaonkar, Ipswich (GB)

(73) Assignee: British Telecommunications public limited company, London (GB)

( * ) Notice: Subject to any disclaimer, the term of this patent is extended or adjusted under 35 U.S.C. 154(b) by 1251 days.

(21) Appl. No.: 11/794,256

(22) PCT Filed: Dec. 23, 2005

(86) PCT No.: PCT/GB2005/005075
§ 371 (c)(1),
(2), (4) Date: Jun. 27, 2007

(87) PCT Pub. No.: WO2006/070189
PCT Pub. Date: Jul. 6, 2006

(65) Prior Publication Data
US 2008/0157927 A1    Jul. 3, 2008

(30) Foreign Application Priority Data

Dec. 31, 2004  (GB) .................................. 0428543.3

(51) Int. Cl.
*G08B 21/00* (2006.01)

(52) U.S. Cl. ...... 340/10.1; 340/5.74; 340/5.8; 340/5.81; 340/5.21; 235/375; 235/385

(58) Field of Classification Search ................. 340/10.1, 340/10.51, 5.71, 5.74, 5.8, 5.81, 5.1, 5.2, 340/5.21, 5.24; 235/375, 385
See application file for complete search history.

(56) References Cited

U.S. PATENT DOCUMENTS

| 5,629,981 | A | * | 5/1997 | Nerlikar | 713/168 |
| 6,961,000 | B2 | * | 11/2005 | Chung | 340/572.1 |
| 6,995,673 | B1 | * | 2/2006 | Osredkar et al. | 340/572.1 |
| 7,000,834 | B2 |  | 2/2006 | Hind et al. | |
| 7,357,318 | B2 | * | 4/2008 | Honda | 235/385 |
| 2001/0029579 | A1 |  | 10/2001 | Kusakabe et al. | |
| 2005/0099268 | A1 | * | 5/2005 | Juels et al. | 340/10.4 |

FOREIGN PATENT DOCUMENTS

| JP | 10-324405 A | 12/1998 |
| JP | 2001-134672 A | 5/2001 |
| JP | 2001-195548 A | 7/2001 |
| JP | 2001-283171 A | 10/2001 |
| JP | 2001-307055 A | 11/2001 |

(Continued)

OTHER PUBLICATIONS

International Search Report mailed May 29, 2007.

(Continued)

*Primary Examiner* — Toan N Pham
*Assistant Examiner* — Mark Rushing
(74) *Attorney, Agent, or Firm* — Nixon & Vanderhye P.C.

(57) ABSTRACT

A control device, method and system for controlling data exchange between entities and item identification devices associated with said control device; said entities having an associated data exchange means for exchanging data with item identification devices; said data exchange means being arranged to provide authentication data indicative of the entity with which they are associated; and said control device comprising means for enabling exchange of data between said item identification devices and the entity with which said data exchange means is associated in accordance with an applicable access policy for that entity.

21 Claims, 9 Drawing Sheets

System including a control device

FOREIGN PATENT DOCUMENTS

| | | |
|---|---|---|
| JP | 2002-312723 A | 10/2002 |
| JP | 2002-319001 A | 10/2002 |
| JP | 2004-247799 A | 9/2004 |
| JP | 2005-92796 A | 4/2005 |
| WO | 2004/086290 A1 | 10/2004 |

OTHER PUBLICATIONS

Rieback et al.: "RFID Guardian: A Battery-Powered Mobile Device for RFID Privacy Management," Department of Computer Science, VRIJE Universiteit, Amsterdam, NL, pp. 184-194, XP002410133.

Juels et al.: "The Blocker Tag: Selective Blocking of RFID tags for Consumer Privacy," Proceedings of the 10th. ACM Conference on Computer and Communication Security (CCS'03), Washington, DC.,vol. CONF. 10, pp. 103-111, XP002341165, Oct. 27, 2003.

Menezes et al.: "Handbook of Applied Cryptography," Handbook of Applied Cryptography, CRC Press Series on Discrete Mathmatics and its Applications, pp. 548-550, Boca Raton, FL, XP002410134, 1997.

Juels: "Soft blocking flexible blocker tags on the cheap," Proceedings of the 2004 ACM Workshop on Privacy in the Electronic Society, Washington, D.C., Oct. 28, 2004, pp. 1-7, XP002410135.

International Search Report mailed May 29, 2007 in International Application No. PCT/GB2005/005075.

UK Search Report dated Mar. 7, 2005 in Application No. GB 0428543.3.

Rieback et al., "RFID Guardian: A Battery-Powered Mobile Device for RFID Privacy Management," Department of Computer Science, Vrije Universiteit, Amsterdam, The Netherlands, 2005, pp. 184-194.

Juels et al., "The Blocker Tag: Selective Blocking of RFID Tags for Consumer Privacy," Proceedings of the 10th ACM Conference on Computer and Communications Security (CCS '03), Oct. 27-31, 2003, ACM, vol. Conf. 10, pp. 103-111.

Menezes, "Handbook of Applied Cryptography," CRC Press Series on Discrete Mathematics and Its Applications, 1997, pp. 548-550.

Juels et al., "Soft Blocking: Flexible Blocker Tags on the Cheap," Proceedings of the 2004 ACM Workshop on Privacy in the Electronic Society, Oct. 28, 2004, 14 pages.

Juels et al., "Squealing Euros: Privacy Protection in RFID-Enabled Banknotes," RSA Laboratories, Financial Cryptography '03, 2003, 22 pages.

Sarma et al., "RFID Systems and Security and Privacy Implications," CHES 2002, LNCS 2523, 2003, pp. 454-469.

Juels, "Minimalist Cryptography for Low-Cost RFID Tags," Security in Communications Networks, 4th International Conference, Amalfi, Italy, Sep. 8-10, 2004, 29 pages.

Ohkubo et al., "Cryptographic Approach to "Privacy-Friendly" Tags", RFID Privacy Workshop, Nov. 2003, 9 pages.

Floerkemeier et al., "Scanning with a Purpose—Supporting the Fair Information Principles in RFID Protocols," Lecture Notes in Computer Science, vol. 3598, Jun. 2005, pp. 1-9.

Notice of Reasons for Rejection mailed Sep. 6, 2011 in Japanese Application No. 2007-548894 (4 pages).

* cited by examiner

Fig. 1: "Data" and "Control" Information

Fig. 2: Elements and Interactions in a Reader-Tag System

Figure 3: The "Supply Chain Scenario" or Shipping Environment

Figure 4: System including a control device

Figure 5: Process of interactions

Figure 6: RFID Tag Properties

Figure 7: Structure of Access Policies

Figure 8: System for Reader Authentication

Figure 9: Use of Local Key to protect a Local Domain

CONTROL OF DATA EXCHANGE

This application is the US national phase of international application PCT/GB2005/005075 filed 23 Dec. 2005, the entire content of which is hereby incorporated by reference.

TECHNICAL FIELD

The present invention relates to the control of data exchange between entities, such as commercial organisations, and item identification devices, such as RFID tags, via a data exchange means such as an RFID tag reader and/or writer device.

BACKGROUND TO THE INVENTION

Radio Frequency Identification (RFID) is currently presented as a high-potential enabling technology that could radically change the way that information is handled. RFID tags are mainly used in supply chains to automate the identification process without requiring line-of-sight during reading operations. Identity information could have potential benefits in many application domains.

Typically, an RFID tag consists of an integrated circuit with a small storage capability and an antenna. Some tags, referred to as "active tags", have an internal power source which is generally used to power any processing circuitry and to generate outgoing signals. Other tags, referred to as "passive tags", do not have any internal power source. Passive tags generally get the energy required for responding to incoming signals and generating outgoing signals by collecting power from an electromagnetic field generated by a reader. Also, there exist tags known as "semi-active" (or sometimes "semi-passive") tags, which generally have a small power source in order to enable the tag's processing circuitry to be powered constantly. These tags therefore do not need to collect power from incoming signals before commencing any processing, allowing them generally to provide faster responses than passive tags.

An RFID tag generally holds identity information relating to an associated physical object, such as a commercial product. Upon being queried by a reader, the tag generally responds with the identity information which may point to a unique location on a back-end database which stores detailed information about the object, such as expiry date, manufacture location, current location, etc. This information can be made available to the user essentially in real-time.

Surveys have repeatedly identified privacy as one of the most important concerns linked with the deployment of RFID technology to tag commercial products. Briefly, if objects are tagged, anyone with an RFID reader can potentially discover information relating to the objects, their owners, or their users, without the permission of the owners or users. Individuals holding RFID tags could be affected by surreptitious tracking and tag information could be used to collect personal information and profile user preferences. Similarly, companies owning RFID-tagged products would be vulnerable to espionage. Competitors could track their products just by monitoring tag IDs.

All RFID tags operate through the radio spectrum, which anyone within range can receive. Many of the current generation of tags lack access control capabilities, thus anyone, including malicious users, can read the information stored on the tag. A static "Unique Identifier" stored on the tag links the tagged object with the individuals or the company owning the object. Concrete evidence of RFID tags privacy concerns relates principally to the following issues:

Traceability: A unique identification number allows non-authorised readers to track a product as it moves from one reader to another.

Information Leakage: RFID Tags carry information about the product to which they are associated. Malicious hidden readers could collect product information without the owner's approval. (For example, RFID-tagged products owned by users thus provide potentially valuable information about the user's preferences.)

Researchers and industrial activists have studied different approaches to mitigate RFID privacy problems. Most approaches burden the tag by incorporating some additional functionality onto the tag, changing the reader-tag communication protocol or adding new infrastructure such as encryption units or special tags. Ideally, the solution should provide adequate privacy protection at minimal cost.

Juels and Pappu [1] have proposed a method for RFID enabled banknotes. The serial number of "Euro" banknotes is carried by an RFID tag and protected through an encryption scheme. The serial number is subjected to re-encryption by computational devices that renders the traceability of the banknotes difficult. This scheme requires a single-verification entity and it is not compatible with multi-domain systems likely in supply chains scenarios.

[1] A. Juels and R. Pappu. "Squealing Euros: Privacy-Protection in RFID-Enabled Banknotes". In R. Wright, ed., Financial Cryptography '03, pages 103-121. Springer-Verlag. 2003. LNCS no. 2742.

Weis, Sarma, Rivest and Engels [2] have proposed several security mechanisms to improve security in RFID systems. They have identified issues of attack based on eavesdropping and recognized that the power of the tag-to-reader communication is much weaker than that of reader-to-tag communication. The scheme proposed involves the use of hash functions and a pseudo-random generator on the tag. The system is based on a reverse hash-function look-up performed on a back-end server.

Due to these properties the scheme is impractical for large retailers and can only be efficient for owners of relatively small numbers of tags. Furthermore, pseudo-random generators cannot be implemented in current RFID tag technology.

[2] Sanjay E. Sarma, Stephen A. Weis, and Daniel W. Engels. "RFID Systems and Security and Privacy Implications". In Workshop on Cryptographic Hardware and Embedded Systems, pages 454-470. Lecture Notes in Computer Science, 2002.

In "minimalist cryptography" [3a] Juels proposes a method in which a tag contains different pre-programmed pseudonyms. By disclosing a different pseudonym during each read operation tracking can be avoided. An authorised reader needs to be linked to a database to associate the pseudonym to the correct ID. The main weakness of this approach is the need to renew the set of pseudonyms in the tag. A more complex approach [3b] from NTT laboratories involves the use of secure hash chain functionality to automatically renew secret information contained in the tag. The rationale behind this approach is that a tag should not respond predictably to reader queries. The tag refreshes its identifier autonomously through the use of two hash (H and G) functions, and outputs a different pseudonym on each read. The secure database can map the tag output with the product information because it has access to the secret value used to generate the sequence of tag outputs. This solution suffers from scalability problems, as it is expensive to link the pseudonym to the correct ID without a defined hierarchical naming structure.

[3a] A. Juels. "Minimalist Cryptography for RFID Tags". In C. Blundo, ed., Security of Communication Networks (SCN), 2004.

[3b] Miyako Ohkubo, Koutarou Suzuki and Shingo Kinoshita: "Cryptographic Approach to "Privacy-Friendly" Tags", believed to have been presented at MIT in November 2003. See: http://lasecwww.epfl.ch/~gavoine/download/papers/OhkuboSK-2003-mit-paper.pdf These schemes incorporate some additional functionality onto the tag to address the lack of access control. However, their technology assumptions are not obviously applicable. RFID tags, particularly those that are likely to be widely deployed, will have several resource and architecture constraints.

(1) The "Juels and Pappu" proposal requires a trusted third party approach that can only be efficient in very specific contexts.
(2) The "Weis et al." solutions are limited by the restricted amount of resources available in current passive RFID tags.
(3) The pseudonym solutions require additional memory on the tag.

Two alternative approaches to privacy and security problems encountered with RFID tags are outlined in the work of Juels, Rivest and Szydlo on the RFID Blocker Tag [4] and the work of Juels and Brainard on the Soft Blocking approach [5]. They both describe privacy enhancing solutions that can mitigate certain potential privacy issues.

The "Blocker Tag" is a disruptive scheme that obstructs reading operations by simulating the presence of a large set of RFID tags. It works on the singulation process implemented in current tag-reading standards interacting with the 'tree-walking' or ALOHA scheme. A blocker tag is a specific purpose device that users carry around for privacy protection and it prevents a private tag from being read. The main drawback of this solution is the disruption of reading operations. This weakness undermines the practicality of this solution.

[4] "The Blocker Tag: Selective Blocking of RFID Tags for Consumer Privacy". In V. Atluri, ed. 8th ACM Conference on Computer and Communications Security, pp. 103-111. ACM Press. 2003.

The "Soft Blocker" approach is a simple approach that expresses the privacy preferences of the RFID tags to the readers. This requires a privacy agent on the reader and a classification for the tag. For example, a tag that is classified as private causes the privacy agent on the reader to not disclose the value of the tag. In the same situation if a blocker classified tag is read, the privacy agent will filter out sensitive tag data. The main advantage of this solution is the flexibility in terms of policy implementation. New privacy policies could be arbitrarily created for different scenarios. The main weakness is the requirement of an audit mechanism or enforcement service that verifies that the privacy agent implemented in the reader respect the tag classification.

[5] A. Juels and J. Brainard: "Soft Blocking: Flexible Blocker Tags on the Cheap". In S. De Capitani di Vimercati and P. Syverson, eds., Workshop on Privacy in the Electronic Society (WPES), 2004.

Another approach, referred to as the "Watchdog" tag, is discussed by Floerkemeier, Schneider and Langheinrich [6]. This is an active tag that overhears communication between the reader and the tag. A Watchdog tag can log identification information relating to the reader, the purpose of the reading operation and possibly the position of the reader. The data collected may then be made available to a final user for inspection and verification purpose. The Watchdog tag does not provide a privacy enforcement method, but may enhance the visibility of reader-tag interactions.

[6] "Scanning with a Purpose—Supporting the Fair Information Principles in RFID Protocols", Christian Floerkemeier, Roland Schneider, Marc Langheinrich, Institute for Pervasive Computing ETH Zurich, Switzerland.

International patent application WO 2004/086290 relates to methods and systems for authenticating transponders such as those in an RFID system, using devices termed "verifiers". An electronic "watermark" is computed for a transponder and is written to it. When read, the transponder provides its own data together with the watermark. Independently another device computes the correct watermark. Either the verifier compares the two and informs the reader, or the reader makes the comparison itself, in order to authenticate the transponder.

SUMMARY OF THE INVENTION

According to the present invention, there is provided a control device as set out in claim 1.

Also according to the present invention, there is provided a method for controlling data exchange as set out in claim 20.

Further according to the present invention, there is provided a system for controlling data exchange as set out in claim 21.

According to embodiments of the invention, it is possible to maintain the necessary security and privacy requirements but without the disadvantages of the prior art systems set out above, and in particular without the need to add complexity to each and every item identification device. Systems having a control device according to preferred embodiments of the invention, may have the advantage of being flexible and compatible with different RFID tag schemes. They may provide significant privacy protection during the transporting (e.g. shipping) or transaction of products between different domains, and may be particularly efficient in relation to large supply chain scenarios to prevent clandestine reading and product espionage.

While preferred embodiments of the invention relate to a control device for use in relation to RFID item identification devices such as known varieties of RFID tags, it is foreseeable that control devices according to some embodiments of the invention may be for use in relation to other types of item identification devices.

One of the disadvantages of current RFID tags is that the cost of active tags capable of performing useful levels of processing is currently considered to be too high for them to be applied individually to large amounts of low-cost goods, whereas the cheaper passive RFID tags available are only capable of performing much more basic functions, such as responding to a specific enquiry with a pre-determined response. Particularly advantageous embodiments of the invention allow for the item identification devices to be simple, low-cost, passive tags, but due to the functionality of the control device according to the invention, levels of security, privacy etc. may be as controllable and flexible as if each item identification device had the functionality of a more complex active tag.

In relation to certain preferred embodiments the control device may be an RFID tag itself, in which case it may be referred to as a control tag. According to such embodiments, it will in general be an active, or at least a semi-active tag, in order for it to be capable of performing the necessary functions of a control tag, but it is not intended for the invention to be limited to active or semi-active control devices.

It will be noted that the problem of many of the prior art systems set out above, while often worded as privacy, can really be regarded as a problem of control.

Control devices according to the invention can be thought of as implementing an 'opt-in' approach, as opposed to the 'opt-out' approach used by the 'blocker tags'. They may be thought of as providing access control, enabling entities that validly 'opt-in' to gain access to information contained in a large number of item identification device such as passive tags. They may allow access control functionality to be displaced from the trusted third party system to the control device, which, unlike a trusted third party, may conveniently travel (physically) with items with which the item identification devices are associated.

A role of control devices according to embodiments of the invention may be to provide a method to secure the link between the identity information stored in a group of passive tags attached to products and the real identity of those products or other information relating thereto, which may be stored in a back-end database. The tag identity information may be protected through a secure scheme such as encryption or pseudonyms. The control device may first authenticate a reader device and then provide the reader with the protocol information required to access the information contained in the passive tags.

A tag or other such item identification device can be thought of as being classified as "private" or "public". The classification may allow a reader to determine which privacy policy is available for a specific tag. A public tag may transmit its own information to a reader without it needing to interact with the control device. A private tag may transmit identity information in an encrypted format. A reader would need to authenticate itself to the control device before being allowed to access the encrypted information.

The following two scenarios will serve to illustrate how embodiments of the invention may apply to two example situations, namely a 'shipping environment' and a 'consumer environment'.

Shipping Environment

As a deployment example we may consider a pallet with 100 products being shipped from company 'A' to company 'B'. Each product is tagged with an RFID tag. Company 'A' would classify all the tags contained on the pallet as private. We must remember that private tags would only disclose information to authorized readers. A control device according to an embodiment of the invention is physically mounted on the pallet. A principal role of the control device is to allow an authorized reader to access the information on the tags.

Company A programs the control device. Company 'A' would program the control device with the certificate of company 'B' and the data required to access the product identity. When the pallet is delivered to company 'B', the control device will authenticate company 'B's reader using the certificate and disclose the secure information. This action would provide company 'B' with the information necessary to read the tags contained in the pallet. Tags that were classified as private during the transition can now be classified as public within the domain of company 'B'.

Of course, the behaviour of the control device could be more complex than this. For instance, custom authorities and shipping companies could have access to products or information relating to them for control and shipping information. This may require company 'A' to delegate access to partial information through the control device.

Consumer Environment

Apart from the work by Juels [5], previous privacy techniques do not provide any solution for an 'opt-in' approach.

The control device approach allows tags to be blocked (through encryption) at the point of sale and then unblocked as they enter in the consumer domain. In this way, tags that have been initially blocked can be re-used. A potential range of new services could be enabled in the consumer environment.

Figure 1:
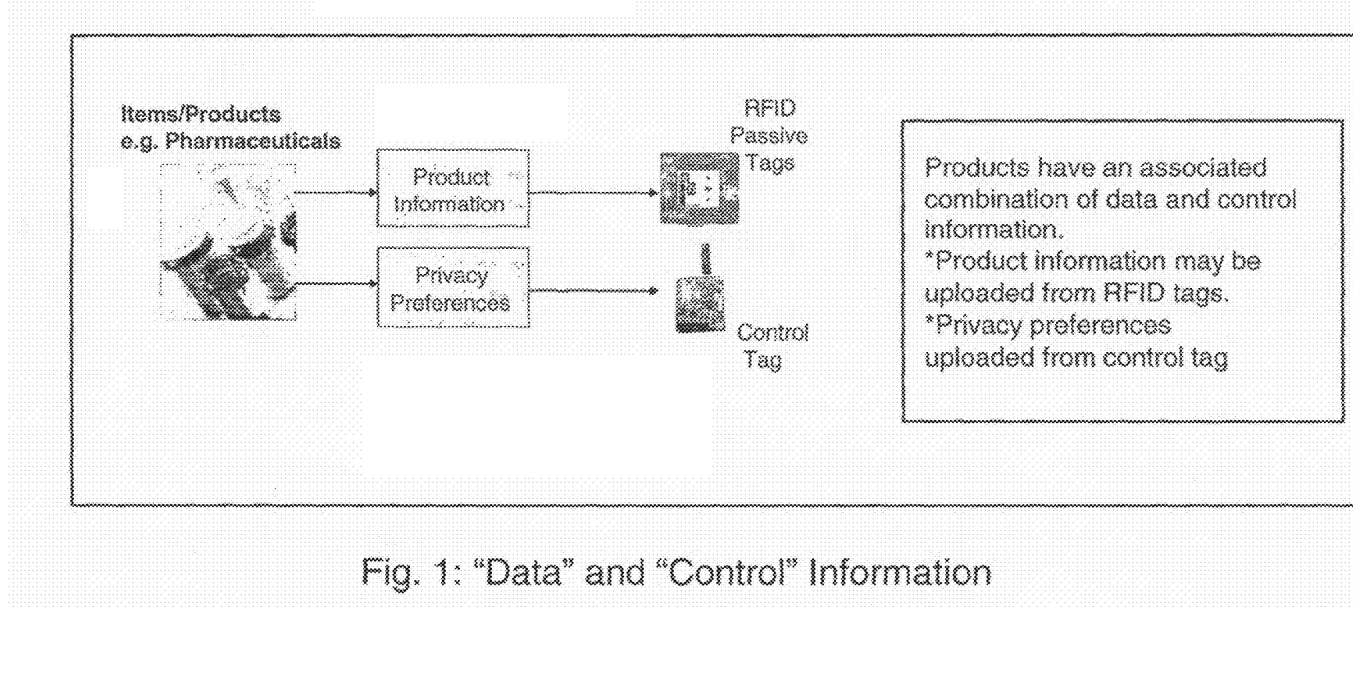
FIG. 1 illustrates the idea of "Data" and "Control" Information in relation to items such as pharmaceuticals or other consumer products.

With reference to FIG. 1, we can consider a pharmaceutical retail environment. Inside the pharmaceutical environment all the tags may be private and used for inventory purpose. As a product is purchased the "ownership" of the tag may be passed from the retailer to the consumer. The consumer's control device may then be updated with information required to access the tag. The user would then be able to use the tag in healthcare and telecare applications.

In this scenario the control device may prevent disclosure of medical information and health records to unauthorised parties while maintaining the privacy of the user and the functionality of the tags.

In view of the above scenarios, it is instructive to look back to previous privacy enhancing technologies for RFID tags, and assess why they have failed. They often rely on features that are unfeasible in practice and solutions that assume a single controlling entity. Until better solutions are more readily available, retailers must support the option to "kill" tags at the point of sale. However, this option is expensive since it requires investment in technology to kill tags, and prevents opportunities for post sale applications. Furthermore, users cannot manually verify that a tag has been killed and may prefer to have the option to control product information.

As a product is distributed along a supply chain multiple parties may wish to access and re-use the product tag for inventory purpose or post sale applications. Companies may want to tag their holdings with legacy identifiers, which help them to automatically link a specific product with inventory information. For example, a drug manufacture could store in the tag a unique drug identifier together with specific drug information. This information should only be accessible by specific parties such as the pharmacy, healthcare services, final users and disposal companies. It is possible that some parties (e.g. pharmacy, hospital, etc.) may want to add more private inventory information to a tag. The question is how to ensure that the tag may only be accessed and read by authorized parties, and how to ensure that privacy is maintained?

Let's evaluate what current solutions can do.

(1) One approach could be to rewrite the tag with a new set of information on each checkout, with only the next owner having access to this information. This is a promising solution but not an option for libraries, rental businesses or supply chains with rotating inventories. Manufacturing information could still be useful even to the recycling company so this information should not be erased.

(2) Another approach is to introduce passwords that authenticate the reader, but unfortunately passwords can be overheard or collected. Passwords schemes also pose other problems: a single password for a set of tags can be easily defeated and is hard to revoke.

For the above reasons, current solutions are not practical to transfer the control of the tags across multiple parties. The ownership of a product could change several times along the product's life cycle and so would the security and the privacy requirements to disclose product information. To the extent necessary, the association between owner and the tag needs to be secure. The privacy-protective implementation disclosed above allows a tag to be viewed as having a combination of a 'data set', which may contain ID and product information, and a 'control set', which may contains privacy policies to control the disclosure of the data set.

Embodiments of the invention manage the privacy of the RFID tag through the control device. The control device may upload the 'control set' (access or privacy policies) and controls the disclosure and/or interpretation of the tag information. When the ownership of a tag and/or product is changed or temporarily transferred, the control device may associate newly authorised readers with the tag. This model can be used in a variety of different situations and introduce a series of advantages compared to current RFID privacy and security solutions.

The following few paragraphs relate to the properties of RFID tags which are of relevance to security, and how these relate to embodiments of the invention.

1. Association and Data Confidentiality. A tag should not leak identity, product or inventory information to surreptitious or non-authorised readers. According to preferred embodiments, a reader device must be authenticated by the control device before being able to access the tag information and is then made to respect the relevant privacy policy.
2. Economic Feasibility. Most approaches burden the tag by incorporating some additional functionality onto the tag, changing the reader-tag communication, protocol or adding new infrastructure such as encryption units or special tags. These schemes could greatly increase the cost of the passive tags. Ideally a privacy solution should provide additional protection without adding additional costs. Two important features of control devices according to embodiments of the invention are as follows:
(1) A control devices may implement all the security primitives to provide access control functionalities without adding technology complexity to the tag.
(2) A control device may "protect" a large number of passive tags. Even if the control device is much more expensive than a normal passive tag, this property maintains its economic advantages.
(3) Control device can be removed at any point of the supply chain. When a reader is authorized to access a specific tag, that tag can be considered public for that reader.
3. Reliability. Previous approaches that incorporate additional device or special tags such as the 'Blocker tag' proposal discussed earlier can be sensitive to tag orientation. The transmission power of a tag on scanning depends on the area it presents perpendicular to the antenna. If a privacy-enhancing device such as the blocker tag is not well aligned, it would sometimes fail and passive tags may leak their identity information. Systems using control devices according to preferred embodiments of the invention allow tags to be "protected" by default. If scanning problems were present the information would not be disclosed. This approach protects privacy but in some cases could prevent 'private' tags from being used.
4. Flexible Privacy Policies. Tag information might be accessible by different players (companies, users etc.) along the product life cycle. In certain applications it is likely that certain readers are only authorized to access a limited amount of tag information. The control device may be arranged to carry access policies for multiple parties at the same time. According to some embodiments, new access policies can be uploaded as the control device is transferred from one player to another. The system may be set up such that additional access policies may be written to the control device by a reader whose identity has been authenticated, and whose access policy allows the writing of access policies (for delegation purposes or otherwise)

The nature of RFID tag/reader communication has often made it difficult to create an efficient privacy enhancing solution. One respect in which RFID interactions have differed fundamentally from online ones is the absence of functionalities such as access control, authentication and key establishment. RFID standards do not allow the identification of the tag reader. Without an identification process in place, it has not been possible to control the disclosure of tag information.

In general, a reader may detect nearby tags and access plain-text information on public tags but is unable to access information on private tags. Private tags may contain information that is encrypted and/or secured. A tag usually stores a unique ID (UID) and information about the product with which it is associated (physically or merely notionally). We can generally distinguish two approaches:

(i) The EPC approach where a tag only carries a unique ID and information about the manufacturer and product type are encoded in this identifier; and
(ii) A memory portioned approach where the tag memory contains ID identifying the products and additional fields to store information about the object to which the tag is attached.

According to embodiments of the invention, a reader establishes secure communication with the control device to get access ("Read" access, "Write" access, or even "Read-and-Write" access) to the private tags. The control device may then implement a role based authentication scheme and verify the privacy policy. This may require storing information about 'RFID reader' identity and role. A role may represent a set of functions in the context of an organization. Such functions could include the ability of a role to read, write, add or modify information in a tag and depend on the privacy policy of the tag. For example, in a shipping scenario, the Customs Authority at a country border could be given the rights and ability to control product information and add information about taxes or duty paid. The role of a shipping company may include the functions to access transport and destination information but not modify the information about the shipped package.

The control device may therefore provide great flexibility enabling additional functionality in an RFID system. For example, a privacy policy may require the control device to maintain a log file of the different organizations that have accessed tag information. This would allow the destination or an auditor to verify the shipping of the product and ensure that no unauthorised readers have accessed the private information. Given future regulation and restrictions in tag reading, this logging capability could create an incentive to prevent and to control surreptitious scanning operations.

As discussed above, a role-based policy may provide different access rights to different roles as tagged products move along a supply chain. Furthermore as products visit new owners, new secure policies could be added to the control device, and new product information could be added to one or more product tags. This would allow nested domains to have readers that can have access to tag information. This delegation feature is secure under the hypothesis that authorized readers can be trusted.

The access rights of a role may be granted and revoked directly by the control device or by a system administrator as products change organization and consumer domains. In some cases it may be required that a reader would have access to a tag for a limited amount of time. In this case a control device may distribute a specific key that is valid for a limited amount of time and will become obsolete after a few reading operations.

Some of the main properties of embodiments of the invention are summarised below:

A control device may extend the standard RFID tag-reader interactions and implement the 'Opt-in' approach in RFID tags which as opposed to the 'opt-out' approach used by the 'blocker tags' discussed earlier.

Secure transient association. A passive tag may be protected as it crosses unauthorised domains but can be easily associated with authorised readers through a role-based authentication process performed by the control device.

A control device may implement a role based authentication scheme. The act of granting access and specifying functions for a role, instead of a more discretionary access control approach, allows a more scalable management of access control rights. A role can be associated to multiple organizations and multiple functions.

A control device may provide a basic security platform to implement additional functionality such as logging (discussed above), disclosure of additional information associated to the scanning process and features to grant and revoke access to specific roles.

It should be noted that the concept of control devices according to the invention may be applicable to different applications involving wireless sensor networks and low resources devices. In a wireless sensor network composed of several nodes that collect sensitive readings in a military application, for example, it may be used to ensure that these nodes only deliver data to the right receiver and not to enemies.

Before accessing information on the sensor network, the reader would need to be authenticated by a control device. During the authentication phase the control device would deliver the secure information necessary to access the information in the sensor network.

DESCRIPTION OF PREFERRED
EMBODIMENTS OF THE INVENTION

With reference to the above figures, preferred embodiments of the present invention will be described in more detail. According to the embodiment now to be described, the control device will be referred to as a control tag, and it will be described in relation to an RFID system as set out below. First there is provides a specific description of the control tag properties and an explanation of how the access-control process could work. The second part relates to the technology design.

FIG. 1 (discussed earlier) illustrates the separation of two aspects: data and control. In general an item identification tag may contain data or information about an item, relating to attributes such as the identity of the item, characteristics of the item such as price, date and place of origin, destination etc., current status of the item, historical data concerning the item etc. This may or may not be accessible to tag readers, depending on whether the information is password-protected, encoded, or otherwise protected or secured. According to prior art systems, any reader having the correct password, decryption key or other access data will be able to read and/or decode/decrypt the information stored on the tag. Identification tags such as simple, cheap, passive RFID tags in particular are not generally equipped with sufficient processing power to recognise or identify different tag readers or to provide different responses to different tag readers. By associating a control device according to an embodiment of the present invention with even such simple identification tags, such a control device is able to manage the extent to which different readers can exchange data (i.e. reading and/or writing) with the identification tags. The "extent" may involve allowing different readers access to different levels of data, or access to data relating to different attributes or combinations of attributes. Alternatively, the "extent" may involve allowing different readers different types of rights, such as "Read-only", "Read-and-Write", "Delegation" (see later) etc.

Control Tag Details and Properties

Figure 2:
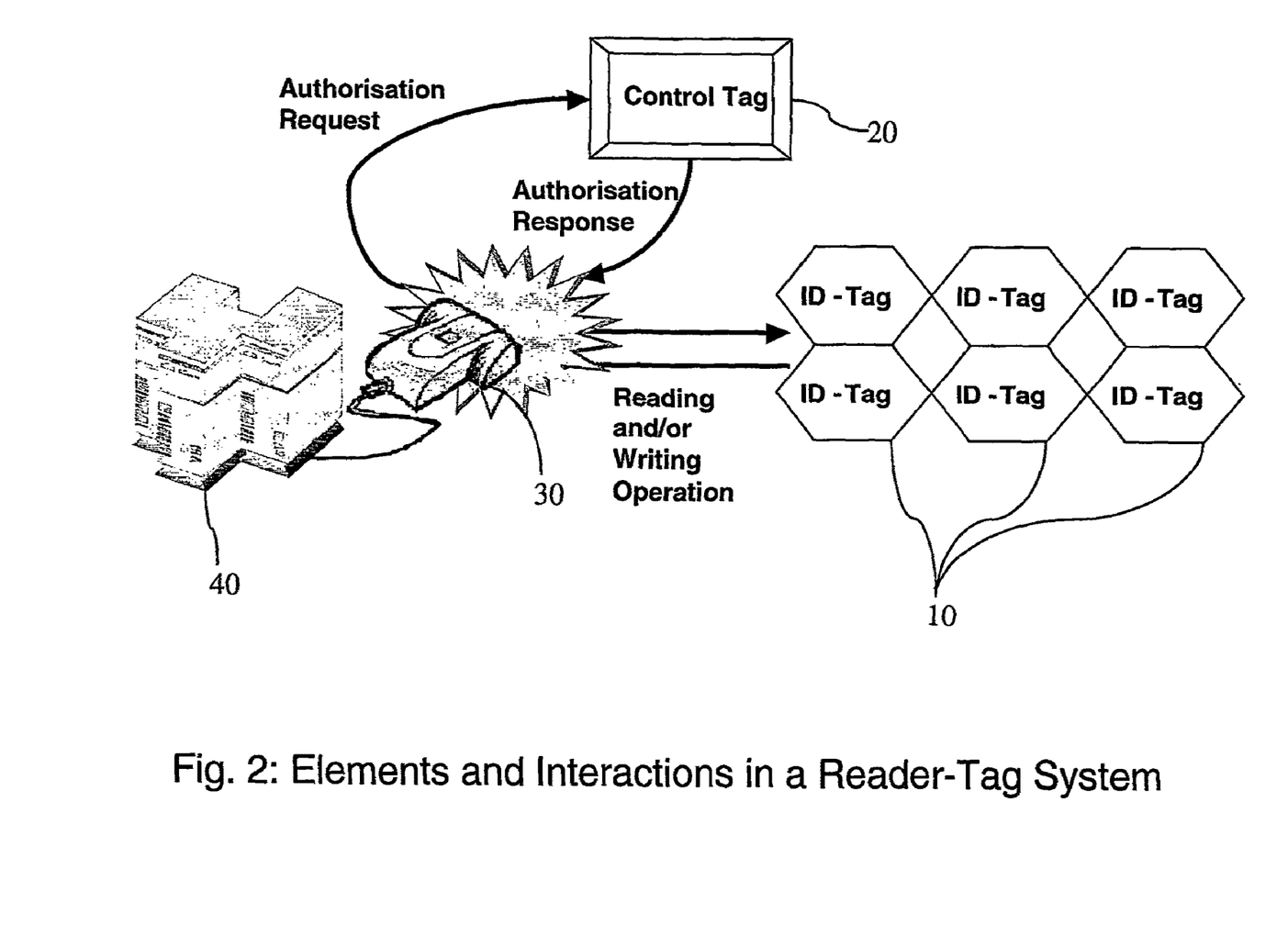
FIG. 2 illustrates the principal elements and interactions in a system including a control tag, a plurality of ID tags, a reader and a back-end database.

With reference to FIG. 2, an RFID system is shown consisting of the following four elements:

(1) Several Radio-Frequency ID Tags 10, each being attached to, or otherwise associated with a product (not shown), and each carrying a Unique ID (UID) and information about the product. The ID tags are preferably cheap, and therefore are likely to be passive tags. They may maintain data confidentiality through an encryption or pseudonym scheme.

(2) A control tag 20, which is an active tag the function of which is to control access to data on the ID tags 10. The control tag 20 includes cryptographic primitives for authenticating a reader 30 and is able to selectively distribute cryptographic keys which may enable read and/or write access to the information on the passive tags.

(3) A reader, or reader/writer 30, able to read and/or write ID tag data and perform an appropriate authentication procedure with the control tag.

(4) The reader may be in contact with a back-end database 40 which may associate records with ID tag information collected by the reader.

The control tag scheme extends the ID tag-reader interactions and implements the access control capabilities required by low resource ID tags to protect their information. A reader 30 needs to establish secure communication with the control tag 20 to obtain the authorization, and to receive enabling data or codes, to access private information on the ID tags.

The control tag 20 implements a role based authentication by storing information about the identities and roles of possible readers 30. When access is granted, the ID tag information can be accessed and/or decrypted Before explaining further how the control tag may implement and/or enforce an appropriate set of access policies, it is instructive to consider again the shipping of goods, with reference to FIG. 3, which shows a "Supply Chain Scenario".

Figure 3:
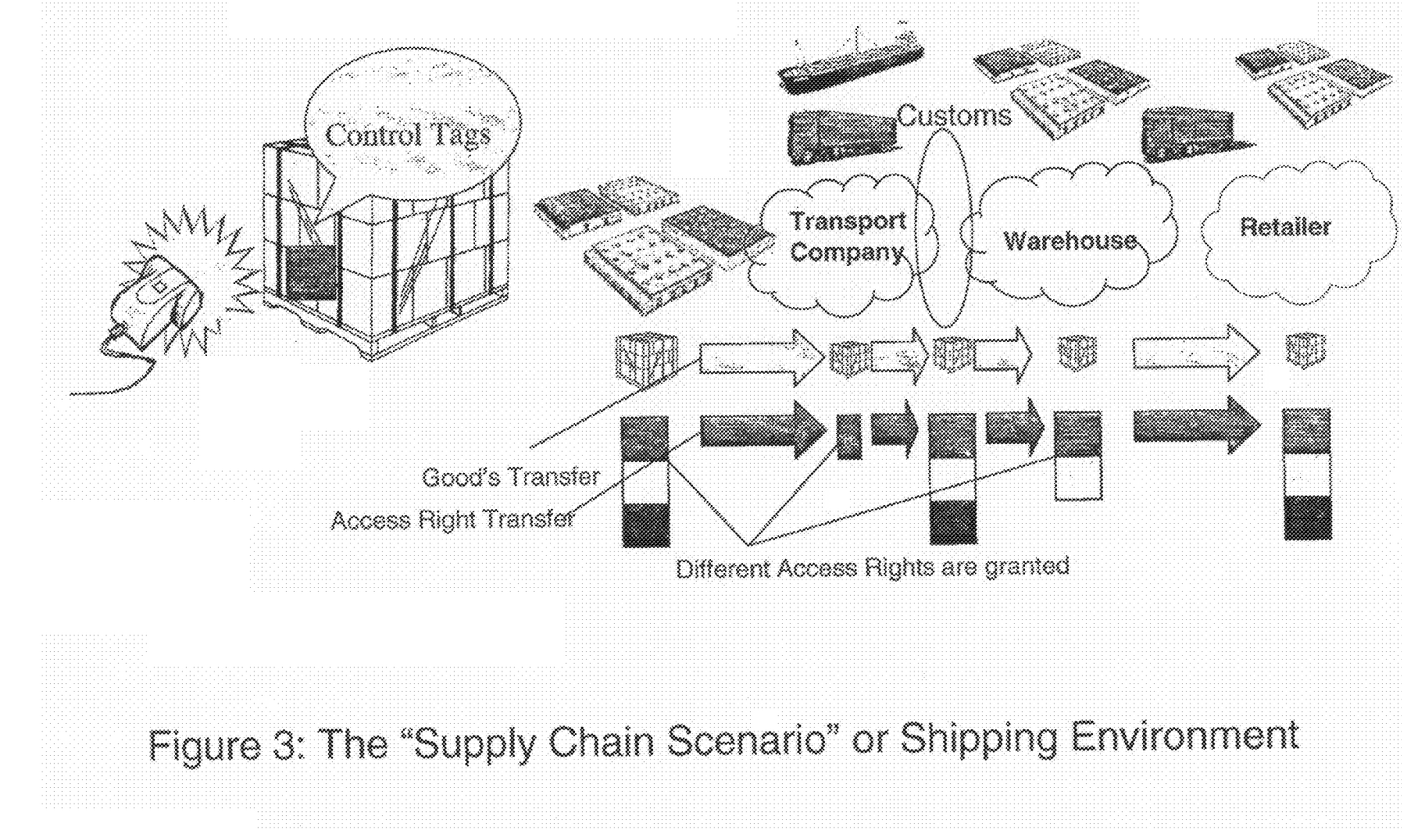
FIG. 3 illustrates the possible use of control tags in a supply chain scenario, or shipping environment.

In this example, a control tag scheme allows the control of release of product information as products, with their associated ID tags, move across multiple domains. Access information is distributed along the supply chain in combination with the product. The rights to access product information are controlled through the control tag, exploiting a role-based authentication process. The control tag contains a set of rules relating to the granting or denying of access, which may comprise Read and/or Write access.

Figure 4:
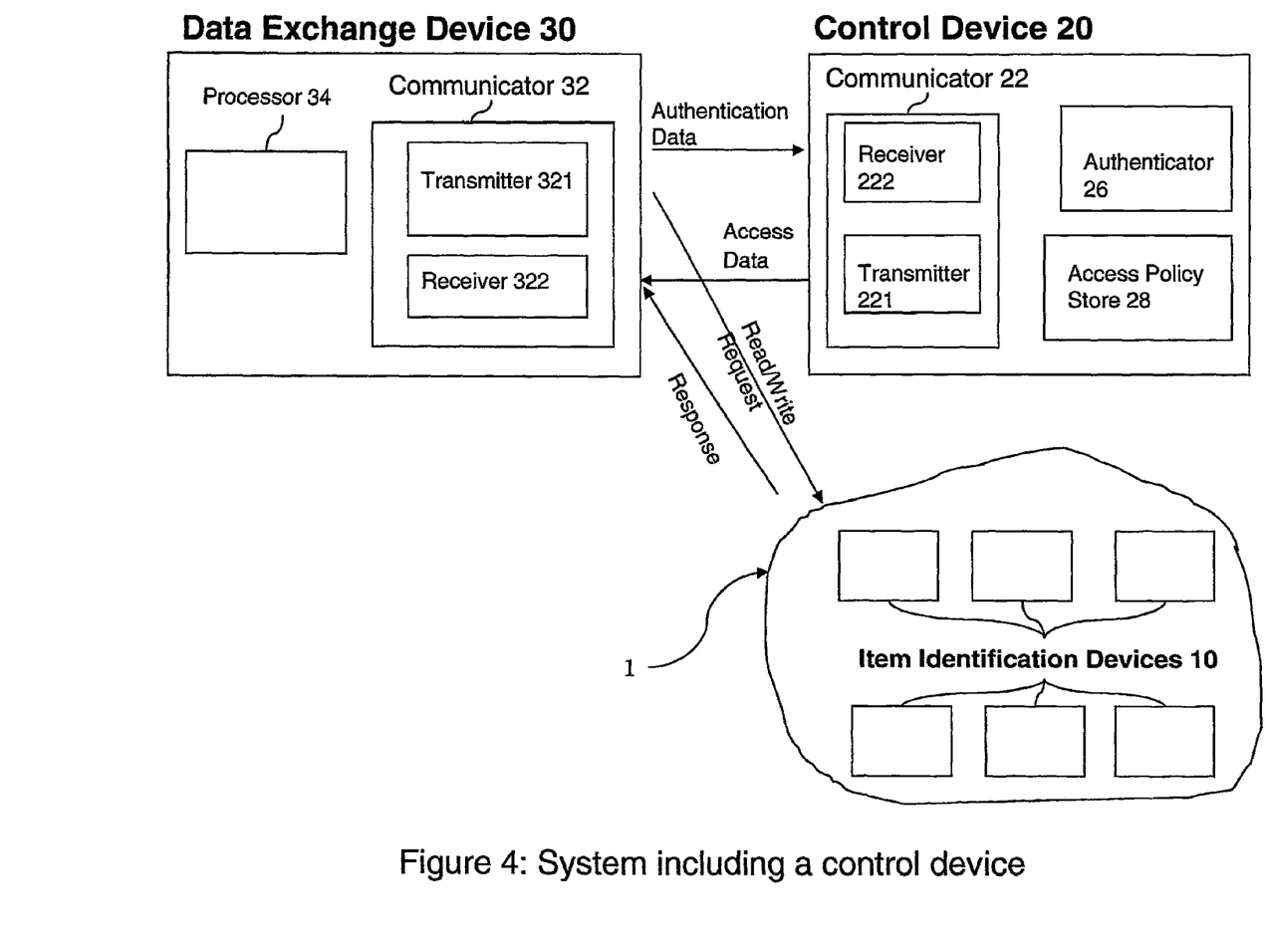
FIG. 4 illustrates a system including a control device according to a preferred embodiment of the invention.

Referring now to FIG. 4, there is shown a consignment 1 of items (not shown individually) such as commercial products being shipped from an initial entity to an eventual entity, via other entities such as freight organisations, warehouses, customs authorities etc. Each of the items has an item identification device 10, such as an RFID tag, attached to it or otherwise associated with it. Associated with the consignment 1 is a control device 20. The entity (not shown) currently in possession of the consignment 1 has an RFID reader/writer or "data exchange device" 30 having RF communication means 32 and data processing means 34. The communication means 32 comprises a transmitter 321 and a receiver 322. The control device 20 similarly has RF communication means 22 comprising a transmitter 221 and a receiver 222, and also has a data authenticator 26 and an access policy store 28. The access policy store stores data indicative of "access policies" for one or more entities, or possibly for categories of entities, which relate to the extent to which an entity (or category of entities) is to be permitted to exchange data with item identification devices 10 with which the control device 20 is associated.

In order to "authenticate" itself, the transmitter 321 of the data exchange device 30 provides authentication data indicative of the entity with it is associated to the control device 20. This is received by the receiver 222 of the control device 20. From it, the authenticator 26 establishes which access policy is applicable to the present entity (or category of entities) with reference to the access policy store. The transmitter 221 of the communication means 22 then provides access data to the data exchange device 30 sufficient to enable it to exchange data with the item identification devices 10, on behalf of the entity with which it is associated, in accordance with the applicable access policy for that entity. Having obtained the access data appropriate to enable the intended extent of access from its interaction with the control device 20, the data exchange device 30 is then able to interact directly with the item identification devices 10 to the extent permitted, which may involve sending read and/or write requests to them, or receiving responses from them, or other possible interactions.

The access data provided by the control device 20 may take the form of a secret "password" necessary to "trigger" a response from, or unlock the item identification devices 10, which would otherwise not reveal their secure data. In this case the above interactions between the data exchange device 30 and the control device 20 will occur before the interactions between the data exchange device 30 and the item identification devices 10. Alternatively, the access data provided by the control device 20 may take the form of a secret "key" necessary to decode responses from the item identification devices 10, which would otherwise only reveal data in a form meaningless to a reader and/or entity without the key. In this case the above interactions between the data exchange device 30 and the control device 20 may take place before or after the interactions between the data exchange device 30 and the item identification devices 10. For higher security, the access data may comprise both of the above types of data, or may include other types, allowing other forms of security protection.

FIG. 5 illustrates in further detail the process of interactions that may take place between a reader R and a control tag A, and between a reader R and any of a plurality of ID tags T. According to this embodiment, the reader R may interact with the ID tags T before, rather than after interacting with the control tag A.

Figure 5A:
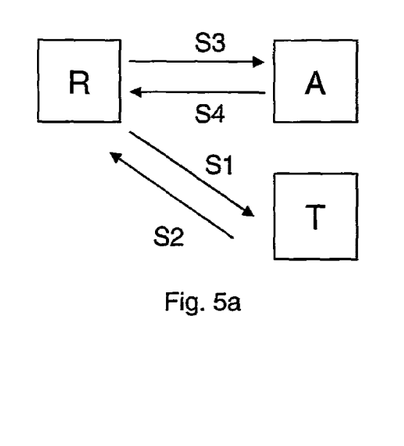
FIG. 5 illustrates in further detail the process of interactions that may take place between a reader and a control tag, and between a reader and a plurality of ID tags.

FIG. 5a introduces the labels S1, S2, S3 and S4, which will be used below, and shows how these interactions correspond respectively to those described above in relation to FIG. 4. Interactions S3 and S4 relate to exchanges between a reader R and a control tag A. Interactions S1 and S2 relate to the exchanges between the reader R and any of a plurality of ID tags T with which the control tag A is associated.

Figure 5B:
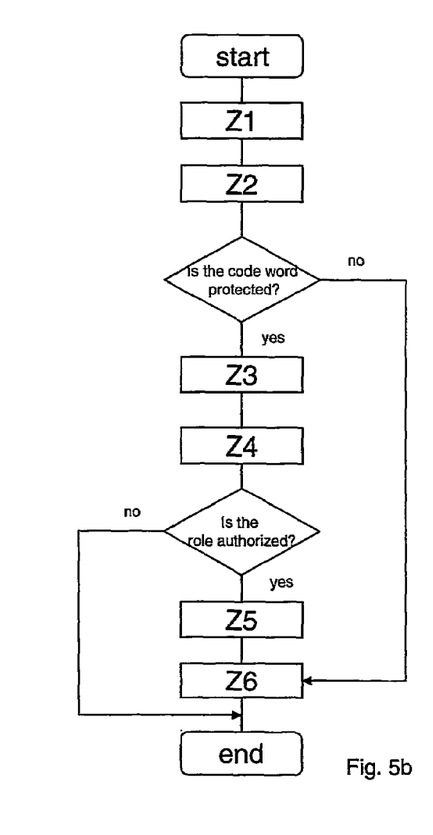

FIG. 5b shows a flow diagram to further explain FIG. 5a. The steps of this flow diagram will now be explained:

Step Z1. A first connection S1 is established between respective communication means of the reader R and an ID tag T.

Step Z2. An information code word S2 is sent from the protected ID tag T to the reader R.

If the transmitted code word is found to be protected by a security scheme, the process moves on to the authorization step:

Step Z3. In step S3 an authorization request is generated, for example by means of the role certificate information of reader R associated with the code word sent by the tag. It may only be necessary to send a part of the code word, however.

Step Z4. The authorization request is transmitted from the reader R to the control device A Step Z5. In a subsequent step, if the information in step S3 is found by the control device A to be valid, access data is released by control device A to reader device R Step Z6. This access to data or function may then be carried out by reader R.

Figure 5C:
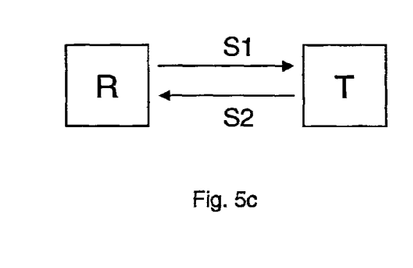

FIG. 5c illustrates the situation where access data has already been released by control device A to reader R.

Figure 5D:
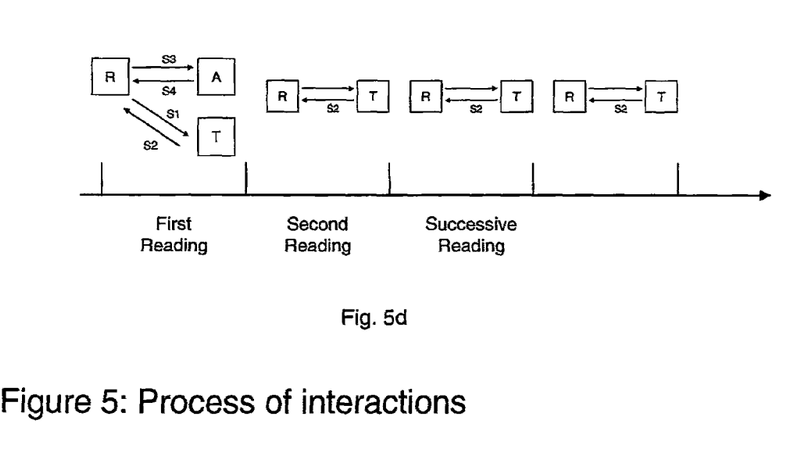

FIG. 5d illustrates the operations required when a reader R intends to access one of the ID-tags T more than once, or intends to access more than one of the ID tags.

In some embodiments, such as that shown in FIG. 5d, the authentication process with control device A needs to be run only the first time. In this case the reader R does not need to contact the control device A multiple times, thus improving the efficiency of the reading operation.

Different levels of security may be chosen or required for each of the interactions. The following levels of security may be used, for example:

S1 connection and message in plain text (no security is used).
S2 code word is sent with security:
Pseudonym for ID information
Encryption for other data information
S3 and S4 are sent through a secure communication channel. The protocol used depends on the communication protocol of the control tag. A control tag could use: 802.11 a,b,g, Bluetooth, 802.15.4 or other protocols.

Control Tag Summary

First the control tag gets control of an ID tag. The policy and the shared secrets associated with an ID tag get uploaded in the control tag. The policy association puts the control tag in control of the ID tag. The policy can be uploaded in different ways. For example, we may assume that a control tag is like a Bluetooth device. We can assume that the control tag gets associated through a radio communication channel. A certification exchange protocol in this case is required. We then require a mechanism to associate a control tag to an ID tag. In a consumer scenario application the tag could be near a special reader that verifies the ID tag and looks up the policy on a database or on the previous control tag. The new control tag then acquires the correct information through the radio channel.

Second, the control tag delegates access. The main feature of the control tag is the capability to delegate access and manage access control. When a tag needs to be read by a reader the reader can receive the right to read that tag for a variable amount of time from the control tag. For example in the case of an ID tag protected by an access password or encryption the control tag can delegate access to the password or encryption key. The scheme supports the control tag and reader to re-write the access password of the tag each time the tag has been delegated to a new reader.

RFID Tag Properties

Figure 6:
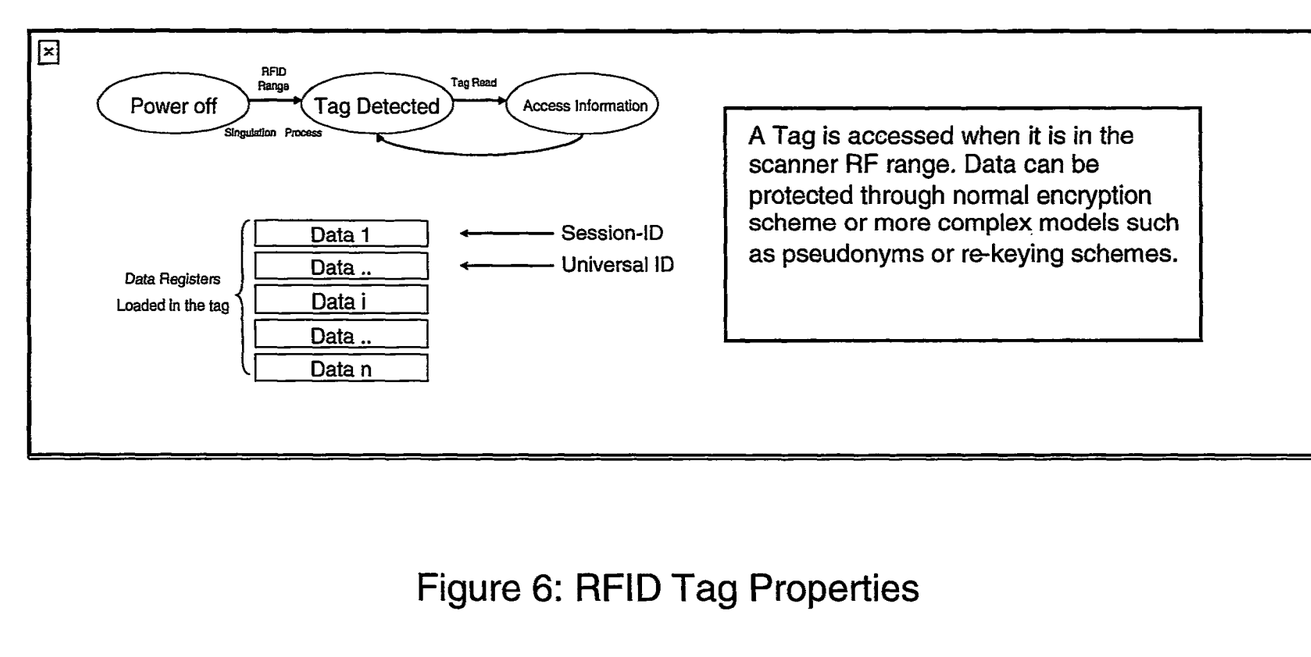
FIG. 6 is a diagram showing possible properties of RFID tags.

Before describing further details of the control tag, some generic properties and features of RFID tags technology will be discussed, with reference to FIG. 6. In current applications, RFID systems in the UHF band (860-960 MHz) can have a range of up to around seven meters. In the HF band (13.56 MHz) this range is down to one or two meters. Once a tag is in the range of a reader the tag may be ready to transmit the information that is contained in its memory. In the case that multiple tags are present an anti-collision protocol may be required to allow reading operations. Some current technologies use an "Aloha" type approach or a deterministic method such as a "binary-tree walking" protocol.

As explained by the ISO/IEC 18000 standard, a tag could contain a set of registers that can be written and read by an interrogator and a set of flags (sleep, write_err, write_prot, etc.) that could be used for specific purposes. The read command may be used by the scanner to access the information stored in the tag.

We may assume that one register contains the 'session_id' (or policy_id) information; this information may maintain the link between an item identification tag and the control tag. The other registers could contain product information and universal ID codes in an encrypted format. A flag could notify the reader, if the information is public or private.

The fields contained in the RFID tags may need to be interfaced with the control tag, so the information in the tag may be maintained as private until a secure association is established. As will be seen in the next section, different levels of security and privacy are available depending on the mechanisms implemented.

Control Tag—Privacy Policy Uploading

As explained above, when a reader wants to access the information on a tag, the control tag must be contacted. Once the identity of a reader has been authenticated, the reader can request the secure information to access the tag.

When the owner of a control tag and an ID tag wishes the control tag to control the ID tag, the control tag must acquire all the necessary information to perform the control operations. This information can contain keys for encryption/pseudonym, passwords for access control, killing passwords for the kill command and access control policies for the readers, and should be transferred in a secure manner.

A Role Based Authentication scheme may be used which manages the access rights for the reader application. Each reader may be associated to one or more roles and each role can be assigned to read or write data relating to one or more types or fields of information in the ID tags. A reader certificate may bring information about the identity of the reader, its role and the physical operator (e.g. company or other such entity) of that reader. This certificate should be globally unique and allow the control tag to establish a secure relationship with the reader.

The communication between readers and the control tag may run over standard communication protocols for low powered devices, such as Zigbee or Bluetooth, or even 802.11a/b/g, if sufficient battery power is available. The communication channel is assumed to be secure (confidentiality and authentication properties).

When a control tag is created, or assigned to a consignment of goods for example, a root certificate may need to be installed. Such a root certificate may always need to be present for administration purpose. The "owner" of the root certificate may be a trusted third party. It may then be necessary to upload the different privacy policies and key information of the different tags. A role that requires access to a specific RFID tag may need to have the certificate loaded and associated with that specific tag.

A control tag may be thought of as an object with a series of associated methods, i.e. the right to access the RFID tags. A role based policy is a statement specifying, for each of the available actions which credentials a reader/scanner should provide to persuade the control tag to grant access to the RFID tag information.

Figure 7:
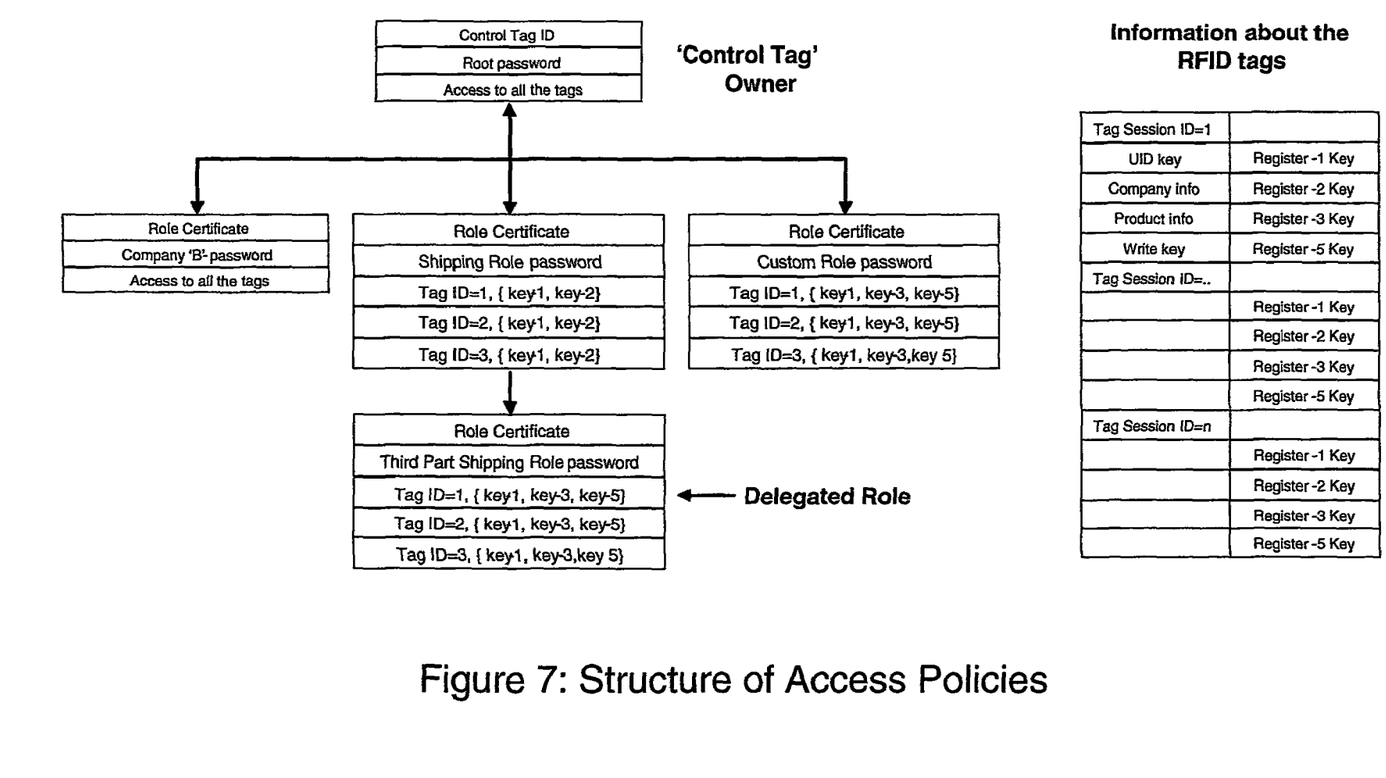
FIG. 7 shows a possible structure of access policies stored on a control tag.

Delegation. With reference to FIG. 7, it is possible that a role having rights in relation to certain ID tags and/or their information, may be given the right to delegate some or all of those rights to another role. This power of delegation should be managed with care. A role when uploading a new policy will in general only be able to delegate access to the information that it has access to itself, or to delegate rights that it has itself. Thus, the delegated role would in general only be granted access to the same (or a smaller) amount of rights, or information, in comparison with the granting role. This approach enables interactions between peers and enhances the flexibility of the proposed scheme.

In the shipping environment described above with reference to FIG. 3, for example, Company 'A' may upload the privacy policies of the ID tags on individual products.

(1) Company 'A' could upload the control tag with the Certificate of Company 'B' associated with 'Session_id' information and the secure information to access the tags. As company 'B' is the final destination we could imagine that company B would probably have the same access rights as company A.

(2) Privacy policies could also grant the access to a shipping company. A role certificate that specifies which information the shipping company should access will be uploaded. The shipping company could delegate this access to a third party shipping company.

(3) Privacy policies may well grant access rights to Customs authorities so that the products can be automatically checked when crossing national borders. This role may provide the right to write information in the ID tags, for example, to indicate that duties or taxes have been paid for example.

Reader Authentication and Data Disclosure

Figure 8:
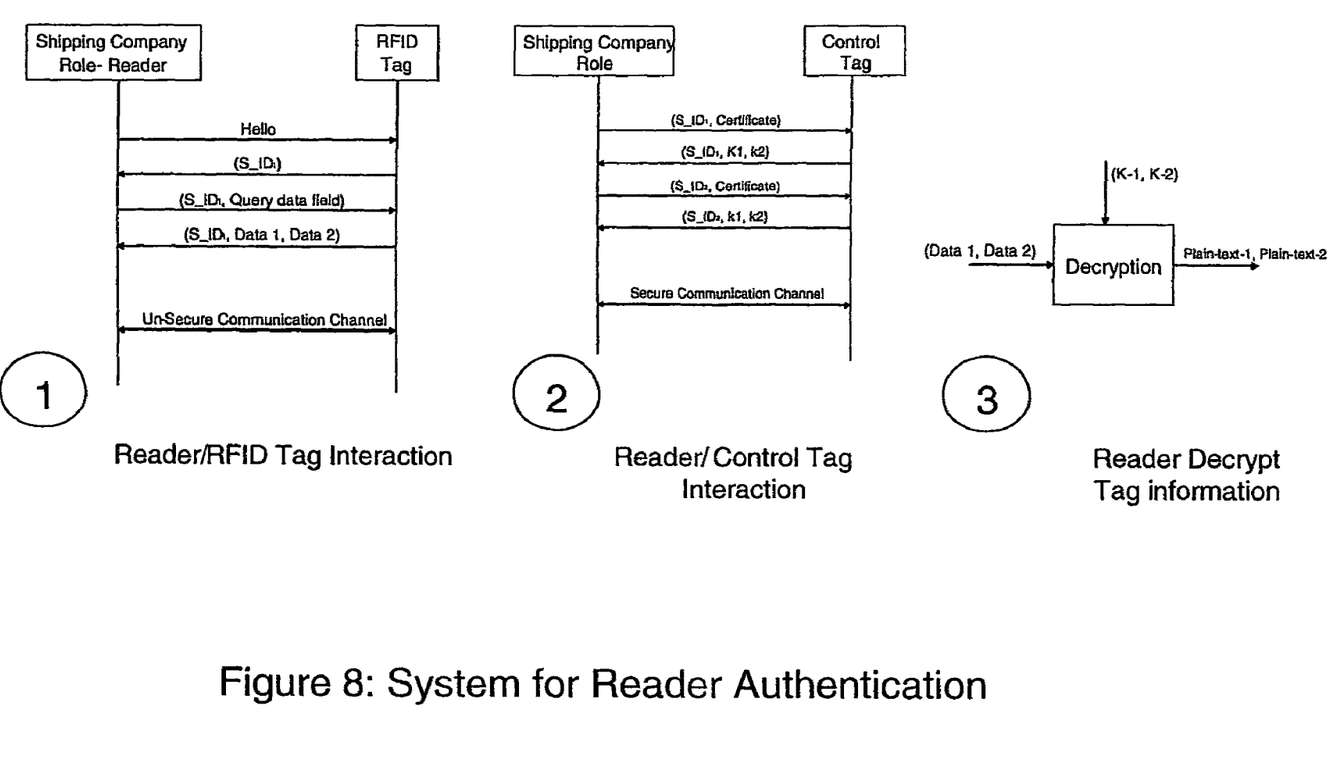
FIG. 8 shows a possible system for reader authentication and data disclosure using a control tag according to an embodiment of the present invention.

As described earlier, preferred embodiments of our system assume that tag information on individual item tags is protected by distinct security keys, the control tag providing a reader with the correct key or password to access the correct data. With reference to FIG. 8, the scheme may work in the following manner:

At Setup time, a Session_ID is given to each item tag, this being a number that is meaningless in terms of inventory or product information but that allows the control tag and the item tags to be linked. This resolves the issue of knowing which key should be disclosed. The session_ID may be used to maintain a link between an item tag and the control tag. It is possible that a static session_ID may allow tracking. If tracking is considered a problem, a dynamic session_ID could be used that refreshes at each reading operation, in a manner similar in some regards to the "pseudonyms" approach outlined in [3] above.

(1) During a read operation, an ID tag (such as RFID item tag) sends a message (S_ID, Private) consisting of the 'Session_ID' information.
(2) The reader would then query the control tag, through a secure communication channel, with a "pair" (certificate, S_ID) (i.e. two types of information: the certificate that correspond to the access policy and the 'Session_ID' information, S_ID). If the certificate is recognised the control tag would then disclose the keys to access the confidential information stored in the ID tag (S_ID, K1, K2, K3, ..., Kn).
(3) The reader would then query the ID tag (S_ID) to obtain the information contained in different registers. The information is transmitted in encrypted form and it would not be disclosed on the reading operation (S_ID, data-1, data-2, data-3, ..., data-n). Upon receiving the information the reader would decrypt the information using the keys disclosed by the control tag.

To sum up, control tags according to preferred embodiments allow the tag-reader interaction to be extended, implementing an 'opt-in' approach to protect the information stored in the ID tag. A method to establish secure transient association may thus be provided such that tag information can only be accessed by authorised roles. A particular advantage of this scheme is that modifications to current RFID technology are not necessary. Suitable methods may be used in such as to be compatible with RFID tags class 0, 1, 2, etc.

There are still some issues that may warrant further attention. It may still be possible to track tagged products through both the static 'Session_ID' field and static data information stored in the registers. Moreover, revocation issues have not so far been addressed. When a control tag discloses secure key information the ID tag may become public for readers that receive it, and there may be no way to revoke this right.

A Local Key Approach—Towards Tracking Protection and Revocation Control

In order to solve the above issues some form of dynamicity may be added to the scheme. This may require some basic secure functionality to be added to item ID tags. The tags could store an additional key and perform a simple encryption function.

Figure 9:
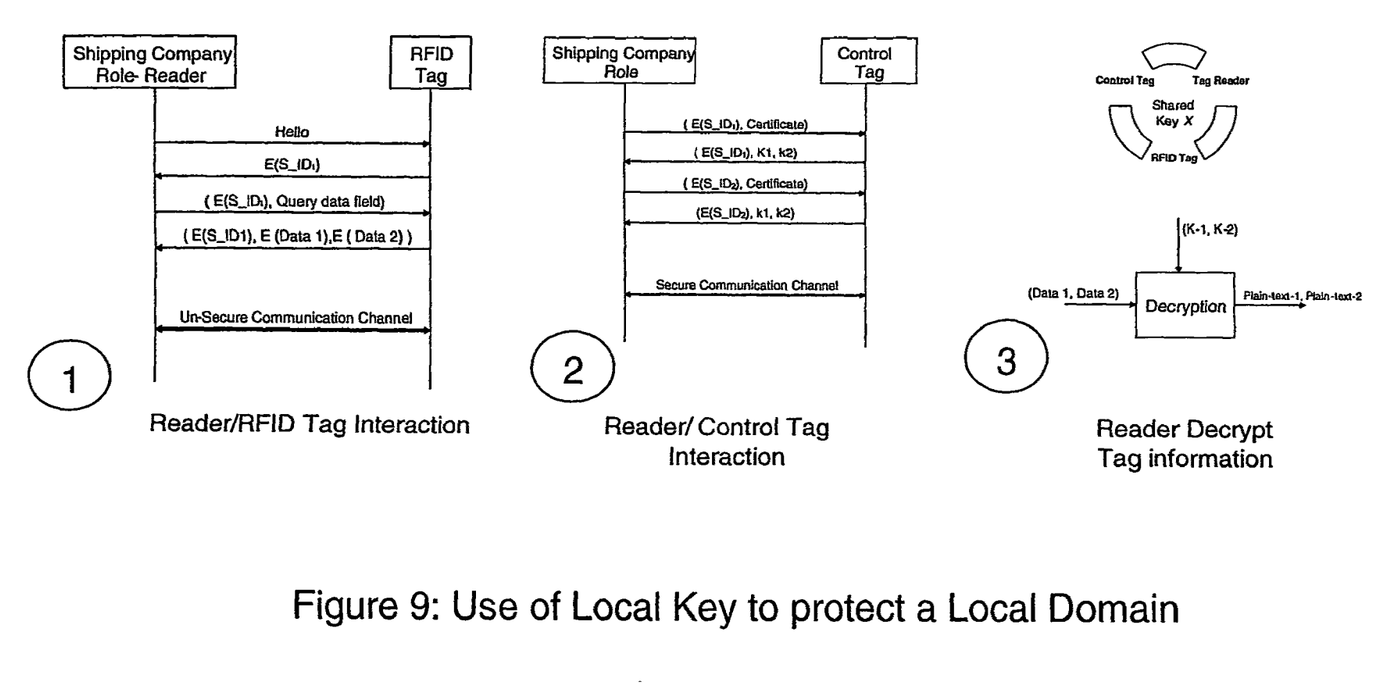
FIG. 9 illustrates the use of a local key to protect a local domain.

With reference to FIG. 9, a solution is to add a local key shared among the reader, the control tag and the item tags. When an item tag is transferred to a new domain (change of tag ownership) the local key is changed. The basic idea in this approach is to employ re-encryption to cause "cyphetexts" of the tag to change in appearance while the underlying plaintexts remain the same. Exploiting this approach the tag information can only be disclosed to the reader that shares the local key.

The local key can be easily shared between the reader and the control tag via the secure communication channel. Nevertheless, it may be a more difficult problem to share a secret with an item tag.

One of the problems with sharing "secrets" is that a passive eavesdropper can overhear the key sharing operation. Outlined here are two possible solutions to this problem:

The reader writes a password on a read only register of the tag through a very short range protocol (surface contact reader). The eavesdropper therefore cannot overhear this communication.

Molnar and Wagner [7] have proposed a method that exploits the asymmetric communication between tags and readers. The tag initiates the communication with a random number that only the reader can hear and based on this random number a local key is shared.

This approach may provides the following features:
(1) A one-to-one secure communication between the reader and the tag is allowed. The access rights to the others roles are temporarily revoked.
(2) Changing the local key can improve the prevention of tracking. Changing the local key more often lowers the probability of tracking.

Now let us assume that a local key X is shared among the reader, the item ID tags and the control tag. Let X be stored in a local register and assume E to be a simple low resource encryption function implemented on an ID tag.

The previous protocol could be modified in the following way:

a. During a read operation, the ID tag sends a message (E(S_ID), Private) consisting of the 'Session_ID' information encrypted with the local key X. The local key X has been shared between the reader and the ID tag using one of the two methods explained above.

b. The reader then queries the control tag, through a secure communication channel, with a pair (certificate, S_ID). The reader obtains (S_ID, K1, K2, K3, ..., Kn). It will be noticed that K1, K2, ..., Kn is the key used to decrypt the information contained in data-1, data-2, data-n.

c. (3) The reader then queries the ID tag. The ID tag sends information re-encrypted with the local key so that malicious readers cannot track the tag. The ID tag sends a message: (E(S_ID), E(data-1), E(data-2), E(data-3), ..., E(data-n)). Upon receiving the information the reader would decrypt the information using the keys disclosed by the control tag.

[7] Privacy and Security in Library RFID, David Molnar David Wagner, University of California of Berkeley.

The invention claimed is:

1. A control device for controlling data exchange between entities and item identification devices associated with said control device, each of said entities having associated therewith a data exchange device for exchanging data with one or more of a plurality of item identification devices with which said control device is associated, said data exchange device being arranged to provide authentication data indicative of the entity with which they are associated or indicative of a category of entity with which they are associated, said control device comprising:

an access policy storing unit for storing data indicative of access policies for each of a plurality of entities or categories of entities, said access policies relating to the extent to which an entity or category of entities is to be permitted to exchange data with one or more of a plurality of item identification devices with which said control device is associated;

a communication receiving unit for receiving authentication data from one of the exchange devices;

an authentication unit for establishing from received authentication data and from said access policy storing unit an access policy applicable to the entity or category of entities with which said data exchange device is associated, the applicable access policy being selected from the stored access policies in dependence on the received authentication data;

a communication providing unit for providing access data to said data exchange device, said access data enabling the exchange of data between said item identification devices and the entity with which said data exchange device is associated in accordance with the applicable access policy for that entity.

2. A control device according to claim 1, the control device being arranged to provide and receive radio-frequency data.

3. A control device according to claim 1, wherein the control device is an active RFID device.

4. A control device according to claim 1, wherein said item identification devices are radio-frequency devices.

5. A control device according to claim 1, wherein said item identification devices are passive or semi-active RFID devices.

6. A control device according to claim 1, said item identification devices being arranged to provide data relating to one or more items with which said item identification devices are associated.

7. A control device according to claim 6, said item identification devices being arranged to provide item identification data.

8. A control device according to claim 6, said item identification devices being arranged to provide item status data.

9. A control device according to claim 6, said item identification devices being arranged to provide other types of data.

10. A control device according to claim 1, said data exchange device being an RF reader device.

11. A control device according to claim 1, said data exchange device being an RF writer device.

12. A control device according to claim 1, said data exchange device being an RF reader/writer device.

13. A control device according to claim 1, wherein said access data provided enables decoding of encoded data provided by item identification devices.

14. A control device according to claim 1, wherein the said access data provided enables the item identification devices to be caused to provide data.

15. A control device according to claim 1, wherein the said access data provided causes data to be stored by said item identification devices.

16. A control device according to claim 1, wherein said data exchanged between item identification devices and entities comprises data relating to one or more of a plurality of attributes.

17. A control device according to claim 16, wherein said access policies indicate the attribute or combination of attributes about which an entity or category of entities is to be permitted to exchange data with item identification devices with which said control device is associated.

18. A control device according to claim 16, wherein said access policies indicate whether an entity or category of entities is to be permitted read, write, or read-and-write access in relation to data relating to said one or more attributes.

19. A control device according to claim 1, wherein said access policies indicate whether an entity or category of entities is to be permitted to delegate rights.

20. A method for controlling data exchange between entities and item identification devices associated with a control device, each of said entities having associated therewith a data exchange device for exchanging data with one or more of a plurality of item identification devices with which said control device is associated, said data exchange device being arranged to provide authentication data indicative of the entity with which they are associated or indicative of a category of entity with which they are associated, said method comprising:

storing data indicative of access policies for each of a plurality of entities or categories of entities, said access policies relating to the extent to which an entity or category of entities is to be permitted to exchange data with one or more of a plurality of item identification devices with which said control device is associated;

receiving authentication data from one of the data exchange devices;

establishing from received authentication data and from stored access policies an access policy applicable to the entity or category of entities with which said data exchange device is associated, the applicable access policy being selected from the stored access policies in dependence on the received authentication data;

providing access data to said data exchange device, said access data enabling the exchange of data between said item identification devices and the entity with which said data exchange device is associated in accordance with the applicable access policy for that entity.

21. A system for controlling data exchange between entities and item identification devices, said system comprising a control device associated with a plurality of item identification devices, and one or more data exchange devices each associated with one or more entities or categories of entities; wherein the or each data exchange device comprises:

a data exchange unit for exchanging data with one or more of a plurality of item identification devices with which said control device is associated; and a data authentication unit for providing authentication data indicative of an entity with which the data exchange device is associated or indicative of a category of entity with which the data exchange device is associated;

and wherein said control device comprises:

an access policy storing unit for storing data indicative of access policies for each of a plurality of entities or categories of entities, said access policies relating to the extent to which an entity or category of entities is to be permitted to exchange data with one or more of said item identification devices with which said control device is associated;

a communication receiving unit for receiving authentication data from said data exchange device;

a data authentication unit for establishing from received authentication data and from said access policy storing unit an access policy applicable to the entity or category of entities with which said data exchange device is associated, the applicable access policy being selected from the stored access policies in dependence on the received authentication data; and a communication providing unit for providing access data to said data exchange device, said access data enabling the exchange of data between said item identification devices and the entity with which said data exchange device is associated in accordance with the applicable access policy for that entity.

* * * * *